April 10, 1934.   1,954,570
E. J. LEVY, NOW BY JUDICIAL CHANGE OF NAME E. L. MAYO
TEMPERATURE INDICATOR FOR LIQUID CIRCULATORY SYSTEMS
Filed July 9, 1927
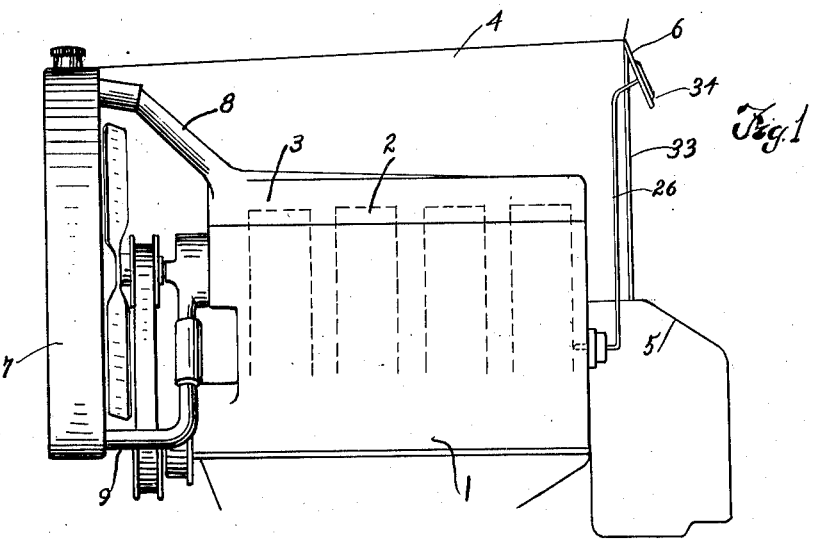
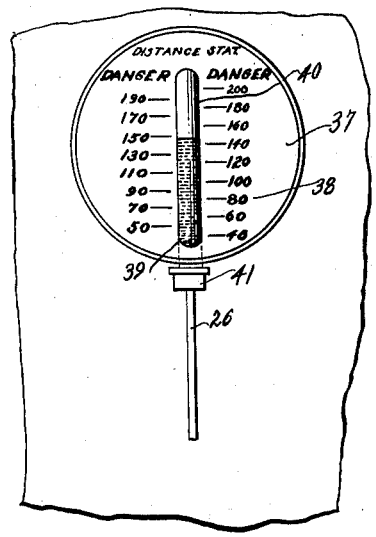
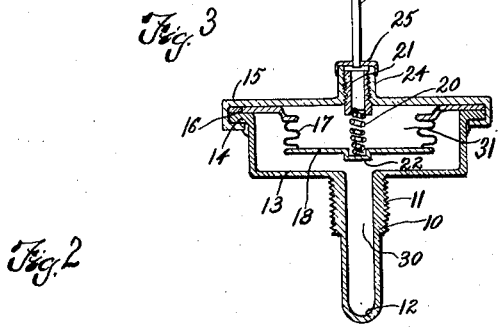
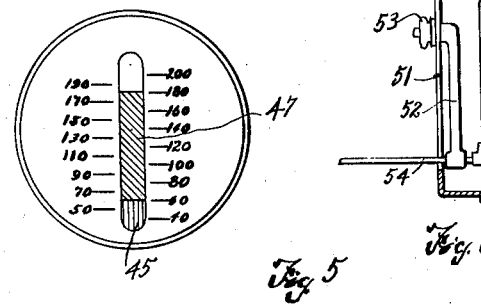
INVENTOR.
Edward Levy Mayo
BY
Fay, Oberlin & Fay
ATTORNEYS.

UNITED STATES PATENT OFFICE 1,954,570

TEMPERATURE INDICATOR FOR LIQUID CIRCULATORY SYSTEMS

Edward J. Levy, Cleveland Heights, Ohio, now by judicial change of name Edward Levy Mayo Application July 9, 1927, Serial No. 204,555

8 Claims. (Cl. 73—52)

The present invention, relating, as indicated, to a temperature indicator for liquid circulatory systems, is particularly directed to the provision of a means for indicating the temperature existing in the circulating or cooling system of an internal combustion engine to a distant point, such, for example as the point adjacent to the other controls and indicators for said engine. A further object of the invention is the provision of a simple and inexpensive indicating means which may be used on motor driven vehicles to indicate to the driver in the driver's compartment the temperature existing in the cooling system of the engine operated in the vehicle.

A still further object of the invention is the provision of means which may be visually observed by the operator of a motor vehicle for indicating the minimum temperature existing in the water jackets around the cylinders of the engine in order that the operator may determine and correct any low temperatures existing which would cause or increase crank case dilution. The prevention of dilution is as important as the prevention of an excess motor temperature and is probably far more important in the ordinary operation of a motor vehicle. The occasions upon which the maximum temperature in the cylinder exceeds the danger point are relatively few while occasions upon which the minimum temperature is below that necessary to prevent crank case dilution (at say 110°) are extremely numerous and the present device is intended as a regulatory means rather than as a danger signal.

To the accomplishment of the foregoing and related ends, said invention, then, consists of the means hereinafter fully described and particularly pointed out in the claims, the annexed drawing and the following description setting forth in detail certain mechanism embodying the invention, such disclosed means constituting, however, but one of various mechanical forms in which the principle of the invention may be used.

In said annexed drawing:—

Fig. 1 is a side elevation partially diagrammatic showing an internal combustion engine and the cooling system therefor, together with my improved indicating means; Fig. 2 is a front view of the dial or indicating means therefor; Fig. 3 is a transverse section illustrating the element adapted to be inserted in the engine for control by the temperature existing therein; Fig. 4 is a modification of the mechanism shown in Fig. 3; Fig. 5 is a view similar to Fig. 2, but illustrating a modification of the invention; and Fig. 6 is a longitudinal central section illustrating another modification of the device of Fig. 2.

Referring now to Fig. 1, I have shown for the purpose of illustrating the use and application of the present invention an internal combustion engine 1, provided with cylinders 2 surrounded by chambers or jackets 3, in which a cooling fluid, such for example as water, is circulated in order to maintain the engine at the desired temperature. The engine 1 is shown mounted in the engine compartment 4 of an automobile, adjacent to which compartment is a driver's compartment 5 in which is a so-called instrument board 6. Adjacent to the engine 1 is a radiator 7, which is connected by means of conduits 8 and 9 to the chambers formed around the cylinders 2, and it will be understood that any desirable means may be employed to cause the fluid in the circulating system to circulate therethrough, the system consisting of the chambers around the cylinders, the conduits 8 and 9 and the radiator 7, together with any circulating means which may be employed, such as any suitable type of pump.

As already explained, it is highly desirable that the temperature existing in the circulatory system and more particularly the minimum temperature existing at the bottom of the cylinder jackets be indicated to the driver. There is ordinarily a considerable differential in temperature, which is constant for a given motor, between the temperature at the top of the jacket and the temperature at the bottom of the jacket. The temperature at the top of the jacket is the maximum temperature while the temperature at the bottom is the minimum temperature and the latter is the temperature which controls the extent of crank case dilution. If the operator can be given this temperature, he can control the operation of the engine and by proper means can increase the minimum temperature. At the same time he is thereby warned of the probable maximum temperature existing since for a given engine the differential is substantially constant and will not exceed more than 10° or 15°.

For convenience I connect my indicating means to the rear cylinder, that is, the one next adjacent to the driver's compartment 5. An opening is first formed in the cylinder wall, in which is placed a thermo-responsive device in the form of a bulb 10 provided with an enlarged portion carrying threading 11 in order that this bulb may be screwed into the cylinder with the lower point 12 within the fluid which is circulating between the cylinder wall proper and the wall of the jacket, in other words, so that the bulb 10 is actually within the circulating fluid. The bulb 10 is hollow and opens at its upper end into the chamber 13 provided with an outwardly extending flange 14, between which and the cover 15 is sealed a ring 16 integrally secured to a flexible corrugated metal wall or bellows 17, which is in turn secured at its other end to a ring or disk 18. This disk 18 is normally maintained in the position illustrated in Fig. 3 by means of a coiled spring 20 interposed between the end of a nipple 21 and a recess 22 in the bottom of the disk 18. The nipple 21 is adjustably engaged within an upturned neck 24 in the cover 15 and is in turn sealed by a cap 25 provided with a central opening, in which is integrally secured a hollow tube 26 communicating with the interior of the nipple 21 and therethrough with the interior of the bellows 17.

The device just described consists of the two chambers 30 and 31 which are sealed against each other, the chamber 30 being filled with an expansive fluid responsive to changes in temperature so that as the temperature of the fluid surrounding the bulb 10 increases that temperature is transmitted through the walls of the bulb to the fluid in the chamber 30, and that fluid in turn is expanded, forcing upward the bottom 18 of the chamber 31 and thus reducing the volume of this second chamber. The second chamber 31 is filled with a suitable liquid which normally completely fills the chamber 31 and partially fills the tube 26. The latter is led upwardly, then through the dash 33 to an indicating gauge 34 carried on the instrument board 6, and shown in Fig. 2. The dial consists of a disk 37 carrying numbers 38 indicating the various temperatures and arranged in vertical columns on either side of an opening 39 disposed vertically and centrally of the dial. Mounted in this opening is a sight tube 40 connected at its lower end through a union 41 with the upper end of the tube 26. When the instrument is first assembled and mounted in position the chamber 31 and tube 26 are completely filled with liquid and are then calibrated so that the tip of the liquid stands in the sight glass 40 at the true height for the temperature then existing around the bulb 10. The liquid may either be a single suitably colored liquid, the height of which may be easily observed, or two liquids may be used, as shown in Fig. 5, in which case the liquid 45 is employed to fill the chamber 31 and tube 26, and a second lighter and different colored liquid 47 is then filled into the bulb on top of the liquid 45. The division line between the two liquids thus gives a very noticeable signal when it appears above the lower end of the sight glass, and can be so arranged as to indicate a dangerously high temperature in the circulatory system and can often be observed when the top of the column would not so quickly be noticed by the operator.

In Fig. 6 there is shown a central section of a modification of the dash indicating portion of my invention in which there is a casing 50 provided with a slot 51 in which is adjustably carried a right angle strap or support 52, the height of which may be adjusted by means of a set screw 53. The liquid containing conduit 54 to the end of which is secured the transparent tube 55 through which the level of the liquid may be observed may be adjusted and positioned vertically by a corresponding adjustment of the strap 52 in the slot 51. Any other suitable means of adjustment may be employed, this adjustment providing a simple and convenient means for remedying errors or inaccuracies of manufacture and for bringing the top of the column of liquid to the proper point in the sight glass 55.

The advantages of the present device are its simplicity, the ease with which it may be adjusted or calibrated and the complete separation of the expansible fluid employed in the bulb and the indicating fluid or liquid employed in the tube or sight glass.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In an apparatus for registering the temperature of a given fluid, a walled chamber comprising a portion adapted to be projected into the given fluid, a movable partition dividing the chamber into a first and second compartment, the first of which is hermetically sealed, a thermally expansive fluid in the first compartment, adapted to expand upon a rise of temperature of the given fluid, and to move the partition to change the volumetric capacity of the second compartment, a conduit communicating with the second compartment, a quantity of liquid filling the second compartment and partially filling the conduit, a part of the conduit adjacent the level of liquid therein having a transparent wall whereby the surface of the liquid is rendered visible, and an indicating scale calibrated in degrees of temperature adjacent the said transparent wall for indicating changes of level of the liquid in the conduit occurring in response to changes of temperature of the given fluid, and a spring for yieldingly opposing the movement of the partition upon expansion of the fluid in the first compartment, and for returning the partition upon a contraction of the fluid.

2. In an apparatus for registering the temperature of a given fluid, a walled chamber comprising a portion adapted to be projected into the given fluid, a movable partition dividing the chamber into a first and second compartment, the first of which is hermetically sealed, a thermally expansive fluid in the first compartment, adapted to expand upon a rise of temperature of the given fluid, and to move the partition to change the volumetric capacity of the second compartment, a conduit communicating with the second compartment, a quantity of liquid filling the second compartment and partially filling the conduit, a part of the conduit adjacent the level of liquid therein having a transparent wall whereby the surface of the liquid is rendered visible, and an indicating scale calibrated in degrees of temperature adjacent the said transparent wall for indicating changes of level of the liquid in the conduit occurring in response to changes of temperature of the given fluid, and a spring for yieldingly opposing the movement of the partition upon expansion of the fluid in the first compartment, and for returning the partition upon a contraction of the fluid, and adjusting means operable through the wall of the second compartment for varying the tension of the spring.

3. In an apparatus for registering the temperature of a given fluid, a generally cup-form chamber having a communicating tubular extension closed at its outer end, and projecting from a wall of the chamber, and containing thermally expansible fluid, a generally cup-form device having an axially collapsible side wall, a cover for the cup-form chamber and device, the peripheries of the cover and of the open ends of the chamber and device being sealedly secured together, and a conduit communicating with the interior of the cup-form device through the cover, and liquid filling the cup-form device and the conduit to a predetermined level therein and a portion of the conduit at said level being transparent.

4. In an apparatus for registering the temperature of a given fluid, a generally cup-form chamber having a communicating tubular extension closed at its outer end, and projecting from a wall of the chamber, and containing thermally expansible fluid, a generally cup-form device having an axially collapsible side wall, a cover for the cup-form chamber and device, the peripheries of the cover and of the open ends of the chamber and device being sealedly secured together, and a conduit communicating with the interior of the cup-form device through the cover, and liquid filling the cup-form device and the conduit to a predetermined level therein and a portion of the conduit at said level being transparent, and a compression spring abutting upon the bottom of the cup-form device and upon a portion of the inner wall of the cover.

5. In an apparatus for registering the temperature of a given fluid, a generally cup-form chamber having a communicating tubular extension closed at its outer end, and projecting from a wall of the chamber, and containing thermally expansible fluid, a generally cup-form device having an axially collapsible side wall, a cover for the cup-form chamber and device, the peripheries of the cover and of the open ends of the chamber and device being sealedly secured together, a conduit communicating with the interior of the cup-form device through the cover, and liquid filling the cup-form device and the conduit to a predetermined level therein and a portion of the conduit at said level being transparent, a screw-threaded adjusting stop means on the cover, and a compression spring abutting upon the stop means and upon the bottom of the cup-form device.

6. In an apparatus for registering the temperature of a given fluid, a liquid-containing conduit, thermally responsive means for varying the liquid level in the conduit, a portion of the conduit at the liquid level being transparent, an indicating instrument housing, a scale on the housing for indicating the liquid level and calibrated in temperatures, an element connected to the conduit and adjustably movable relative to the housing to adjustably move the transparent portion of the conduit, and means for securing the element to the housing in adjusted positions to adjust the liquid level to the scale.

7. In an apparatus for registering the temperature of a given fluid, a liquid-containing conduit, thermally responsive means for varying the liquid level in the conduit, a portion of the conduit at the liquid level being transparent, an indicating instrument housing, a scale on the housing for indicating the liquid level and calibrated in temperatures, a slot in the housing, an element connected to the conduit and movable in the slot to adjustably move the transparent portion of the conduit relative to the housing, and means for securing the element to the housing in adjusted positions to adjust liquid level to the scale.

8. In an apparatus for registering the temperature of a given fluid, a generally cup-form chamber having a communicating tubular extension closed at its outer end and projected from a wall of the chamber and containing thermally expansible fluid, a transverse chamber partition movable axially of the cup and sealed peripherally to the open end of the cup, a cover sealed peripherally to the cup and partition, a conduit communicating through the cover with portions of the partition outwardly of the cup, liquid covering the said outer portions of the partition, and filling the conduit to a predetermined level therein and a portion of the conduit at said level being transparent.

EDWARD J. LEVY.